(12) United States Patent
Straßer

(10) Patent No.: US 11,114,866 B2
(45) Date of Patent: Sep. 7, 2021

(54) ENERGY SYSTEM FOR A MOTOR VEHICLE AND METHOD FOR CHARGING AN ELECTRICAL ENERGY STORAGE DEVICE

(71) Applicant: AUDI AG, Ingolstadt (DE)

(72) Inventor: Roman Straßer, Gaimersheim (DE)

(73) Assignee: AUDI AG, Ingolstadt (DE)

(*) Notice: Subject to any disclaimer, the term of this patent is extended or adjusted under 35 U.S.C. 154(b) by 231 days.

(21) Appl. No.: 16/376,344

(22) Filed: Apr. 5, 2019

(65) Prior Publication Data
US 2019/0341787 A1 Nov. 7, 2019

(30) Foreign Application Priority Data
May 7, 2018 (DE) .......................... 102018207008.3

(51) Int. Cl.
*H02J 7/00* (2006.01)
*B60L 53/30* (2019.01)
*B60L 53/16* (2019.01)
*H01M 10/44* (2006.01)

(52) U.S. Cl.
CPC ............ *H02J 7/0024* (2013.01); *B60L 53/16* (2019.02); *B60L 53/305* (2019.02); *H01M 10/441* (2013.01)

(58) Field of Classification Search
USPC ....................................................... 320/108
See application file for complete search history.

(56) References Cited

U.S. PATENT DOCUMENTS

2012/0274283 A1* 11/2012 van Lammeren ............ H01M 10/4207
320/118
2013/0317661 A1* 11/2013 Feuerstack ............... H01G 9/26
700/295
2014/0312828 A1* 10/2014 Vo ............................. H02J 7/342
320/103
2018/0056798 A1* 3/2018 Syouda ................... B60L 53/11
2019/0103750 A1* 4/2019 Kristensen ............. H02J 7/0016
2019/0341787 A1* 11/2019 Straber ................... H02J 7/0024

FOREIGN PATENT DOCUMENTS

| DE | 102011010227 A1 | 8/2012 |
| DE | 102013102576 A1 | 9/2014 |
| DE | 102014004790 A1 | 10/2015 |
| DE | 102015004119 A1 | 10/2016 |
| DE | 10 2016 015 311 A1 | 7/2017 |
| DE | 102017221033 A1 | 5/2019 |
| EP | 2 541 724 A1 | 1/2013 |

OTHER PUBLICATIONS

German Search Report dated Jan. 9, 2019 in corresponding German Application No. 102018207008.3; 16 pages.
European Office Action dated Jun. 12, 2020, in connection with corresponding EP Application No. 19164809.6 (5 pp., including machine-generated English translation).
Search Report dated Jul. 8, 2019 in corresponding European Application No. 19164809.6; 11 pages including partial machine-generated English-language translation.
Examination Report dated Jun. 22, 2021 in corresponding European Application No. 19 164 809.6; 8 pages including English-language translation.

* cited by examiner

*Primary Examiner* — Mohammed Alam
(74) *Attorney, Agent, or Firm* — Maier & Maier, PLLC

(57) ABSTRACT

An energy system for a motor vehicle and a method for charging at least one electrical energy storage device of the energy system.

7 Claims, 1 Drawing Sheet

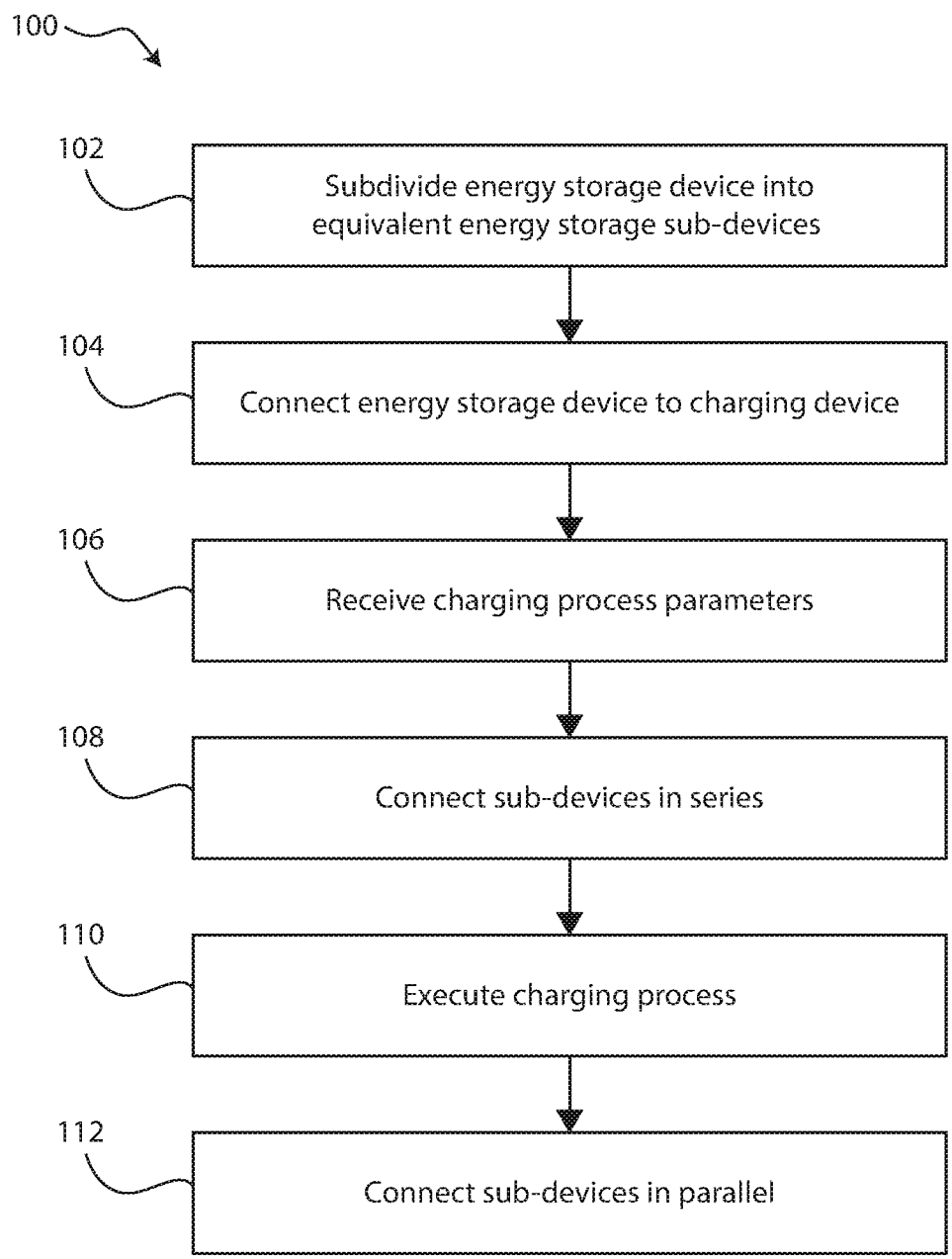

ENERGY SYSTEM FOR A MOTOR VEHICLE AND METHOD FOR CHARGING AN ELECTRICAL ENERGY STORAGE DEVICE

FIELD

The disclosure relates to an energy system for a motor vehicle and a method for charging at least one electrical energy storage device of the energy system.

BACKGROUND

Electric vehicles or hybrid vehicles all have at least one energy storage device, which serves as the traction battery and stores electrical energy, which converts an electric motor on the motor vehicle into drive power. In order to maximize the range of the vehicle, the biggest charging capacity possible of the electrical energy storage device is desired.

In order to charge the electrical energy storage device, such a motor vehicle has at least one electrical charging interface, i.e., at least one electrical connection. By means of such charging interface, the motor vehicle can be coupled to a stationary, electrical charging station in order to charge the energy storage device of the motor vehicle.

Electric vehicles and hybrid vehicles known from the field have an electrical charging interface formed as a charging socket in order to couple the motor vehicle to a stationary, electrical charging station, by means of a charging cable, in order to charge the electrical energy storage device. The energy storage device unit of the parked motor vehicle which is ready to charge is connected to the external energy source by means of a charging cable.

However, the charging processes of the energy storage device unit are normally time-consuming. A substantial shortening of the charging time is not possible because the external energy sources provided for charging the energy storage device unit are limited, especially regarding the charging current.

SUMMARY

The object of the invention is to provide a method for charging an electrical energy storage device of a motor vehicle and to obtain a control device for executing the method as well as an energy system for a motor vehicle which assists in shortening the charging process.

DE 10 2015 004 119 A1 discloses a motor vehicle having an electrical energy storage device and two charging interfaces on the vehicle. Both charging interfaces are designed uniformly and can be coupled to one external charging device each for parallel charging of the electrical energy storage device.

DE 10 2013 102 576 A1 discloses a control device and a method for charging an electrical energy storage device of a motor vehicle. In doing so, the electrical energy storage device is charged by means of at least two electrical charging interfaces simultaneously and thus charged by means of at least two connections simultaneously. To this end, one charging station with at least two electrical connections is used or two charging stations each with an electrical connection are used.

DE 10 2011 010 227 A1 discloses a motor vehicle having an energy storage device unit for electrical energy. The energy storage device unit can be sub-divided into individual blocks, wherein one charging connection element is assigned to each of the individual blocks such that the blocks can be charged separately and simultaneously by an external energy source.

The subject matter of the invention is a method for charging at least one electrical energy storage device of a motor vehicle, wherein the energy storage device is sub-divided into at least two equivalent energy storage sub-devices for the duration of the charging process and they are connected in series.

In one embodiment of the method, the at least one electrical energy storage device comprises a number of cells or cell modules, which can be or are sub-divided into at least two energy storage sub-devices, each comprising at least one electrical cell or a cell module, and wherein the energy storage devices can be connected in parallel or in series.

BRIEF DESCRIPTION OF THE FIGURE(S)

FIG. 1 shows an exemplary embodiment of a method for charging at least one electrical energy storage device of a motor vehicle.

DETAILED DESCRIPTION

According to the invention as shown in FIG. 1, the electrical energy storage device of a motor vehicle is sub-divided into at least two equivalent energy storage sub-devices (blocks) 102, which are connected in series, for a charging process 104. This results in a multiplication of the starting voltage of the electrical energy storage device and thus the maximum applicable charging voltage. This makes possible an especially quick charging process for the electrical energy storage device of the motor vehicle.

According to the invention, the energy storage unit is sub-divided into at least two individual blocks, or rather the electrical cells or cell modules belonging to the energy storage unit are grouped into at least two blocks, each of which comprises at least one electrical cell or one cell module 106. In one embodiment of the method, the energy storage unit is sub-divided into two equivalent blocks. In another embodiment of the method, the energy storage unit is sub-divided into three equivalent blocks. In yet another embodiment of the method, the energy storage unit is sub-divided into four equivalent blocks. When the motor vehicle is driven, the sub-division is suspended, i.e., the blocks are connected in series. In one embodiment of the method, the at least one electrical energy storage device is sub-divided into n equivalent energy storage sub-devices, wherein n is an integer greater than 2.

The blocks are of equal size. Essentially, various sub-divisions of the electrical cells or cell modules are possible depending on the number of electrical cells or cell modules belonging to the energy storage device unit. For example, for an energy storage device unit comprising 60 electrical cells with a grouping into two blocks, each block may comprise 30 cells, and with a sub-division into three blocks, each block may comprise 20 cells, and with a sub-division into four blocks, each block may comprise 15 cells.

The blocks are connected in series 108 for the duration of the charging process 110. This thus means that a shortening of the charging time essentially results such that an essentially higher charging voltage can be used for the charging process when the blocks are connected in series than when they are connected in parallel 112. When the energy storage device is sub-divided into n equivalent energy storage sub-devices connected in series, the charging voltage may be the n-fold of the charging voltage of an individual energy storage sub-device. With a pre-defined maximum charging current, the n-fold charging capacity also thereby results.

In one embodiment of the method, the at least one energy storage device is sub-divided into energy storage sub-devices as a function of a charging voltage available for the charging process. In a special embodiment, the total of the nominal voltages of the energy storage sub-devices is less than or equal to the available charging voltage.

Obviously, during operation of the motor vehicle, there is no disadvantage for the performance capability of the energy storage unit caused by the sub-division of the energy storage device into blocks, because the sub-division into blocks primarily takes place within the scope of the charging processes of the energy storage device unit and is then suspended again.

It is possible for the energy storage device to be sub-divided into corresponding blocks directly from the factory. In one embodiment, the electrical energy storage device of the motor vehicle has two energy storage sub-devices. The energy storage sub-devices can be connected electrically in a parallel connection or can be connected electrically in a series connection by means of switching devices. To this end, a control device can actuate the switching devices. During driving operation of the motor vehicle, the electrical energy storage sub-devices are connected in parallel by means of the switching devices. During the charging operation, the energy storage sub-devices are connected in a series connection by means of the switching device. With two energy storage sub-devices formed as batteries with 400 V nominal voltage each, an energy storage device with 800 V nominal voltage results in the series connection. After the charging process is complete, the energy storage sub-devices are again connected in parallel by means of the switching devices.

In a further embodiment of the invention, the electrical energy storage device has a first energy storage sub-device and a second energy storage sub-device which are electrically isolated from each other in the motor vehicle and are part of a so-called multi-machine concept. Thus, for example, the first energy storage sub-device can be used for driving a front axle of the motor vehicle and the second energy storage sub-device can be used for driving a rear axle of the motor vehicle. Both energy storage sub-devices are connected in series for charging the energy storage device and again electrically isolated from each other after the charging process is finished. The two energy storage sub-devices may be designed, for example, as low-voltage batteries. By closing of the switching device, the two low-voltage batteries can be switched in series for charging, wherein the electrical energy storage device is designed as a high-voltage battery in an advantageous manner. A high-voltage battery in this case is understood to be a battery which provides a voltage between 700 V and 900 V, particularly 800 V. A low-voltage battery in this case is understood to be a battery which provides a voltage between 350 V and 450 V, particularly 400 V.

Due to the series connection of the two energy storage sub-devices during the charging process, i.e., due to the temporary doubling of the nominal voltage of the energy storage device, double the charging capacity can be obtained from the charging device with the specified charging current as compared to the parallel connection of the energy storage sub-devices.

In another embodiment of the method, a dynamic sub-division of the energy storage device is provided, wherein the sub-division of the energy storage device takes place as a function of the performance characteristics of the external energy storage device used in the charging process, e.g., of the maximum available charging voltage and/or of the maximum available charging current.

For charging, the electrical energy storage device is connected, by means of a charging interface, to an external energy source, for example a charging point or a charging station, which can provide a charging voltage, which corresponds to the product from the number of energy storage sub-devices in the electrical energy storage device and the nominal voltage of the individual energy storage sub-devices.

The invention is especially advantageous when the electrical energy storage device to be charged has a voltage level which corresponds to no more than half the maximum charging voltage of the respective external energy source (charging station). Thus, for example, the electrical energy storage device to be charged may have a voltage level of about 400 V and the charging station may have a voltage level of about 800 V. The time required to charge an electrical energy storage device can be shortened with the invention.

In one embodiment of the method, the at least one electrical energy storage device comprises at least one traction battery of an electric vehicle or of a hybrid vehicle.

The subject matter of the invention is also an energy system for a motor vehicle comprising at least one electrical energy storage device, which is configured to be reversibly sub-divided into at least two equivalent energy storage sub-devices connected in series, and a charging interface connected to the energy storage device for charging the at least one electrical energy storage device by means of an external energy source providing electrical energy.

The energy system has at least one energy storage device comprising a number of electrical cells or cell modules for electrical energy. The energy storage device can be connected to an external energy source providing electrical energy, e.g., by means of a charging cable, when the motor vehicle is in a ready-to-charge state.

The charging interface may be a charging interface to which a DC voltage charging station can be coupled by means of a corresponding charging cable, or a charging interface with which a DC voltage charging station can be connected by means of a charging cable. The charging interface may be a charging socket by means of which a DC voltage charging station can be coupled via the charging cable.

In a special embodiment, the charging interface can be coupled to an induction charging station: The induction charging station generates a magnetic field, by means of which the motor vehicle can be coupled to the charging station, without contact, via the charging interface in order to charge the electrical energy storage device.

The charging stations used to charge the energy storage device may have different voltage types, for example alternating voltage and DC voltage, and/or different maximum charging voltages, and/or different maximum charging currents. Furthermore, cable-connected charging stations or charging stations with contactless charging interfaces may be used.

In one embodiment of the energy system, a control device, which is configured to sub-divide the at least one electrical energy storage device into energy storage sub-devices, i.e., to sub-divide the number of electrical cells or cell modules of the energy storage device into blocks and to optionally establish a parallel or serial circuit of the energy storage sub-devices (blocks), is assigned to the at least one electrical energy storage device.

The control device may execute the sub-division of the energy storage device unit into individual blocks as a function of various parameters or by means of a scheme which is predefined or can optionally be predefined by a user. The control device may also be equally designed to control electrical switching devices, which are configured to connect at least two blocks of the energy storage device in parallel or in series. As previously explained, the control device controls and/or regulates the charging of the electrical energy storage device.

In one embodiment, the control device is configured to dynamically sub-divide the electrical cells or cell modules of the energy storage device into individual blocks or rather to combine the electrical cells or cell modules into individual blocks as desired. To this end, the control device is configured to control, particularly electrical, contacts and/or switching means, by means of which the electrical cells or cell modules of the energy storage device can be connected in blocks as desired. It is likewise possible to terminate or reform the existing blocks as desired by means of actuation of the contacts and/or the switching means.

In one embodiment of the energy system, the control device is connected to a communication device, which is configured to communicate with an external energy source and to coordinate a charging process. In doing so, it can specify, for example, a value for a charging voltage of the external energy source. In order to coordinate the charging process, the communication device communicates with the external energy source and the control device of the electrical energy storage device. Reliable charging of the electrical energy storage device is thereby ensured.

In one embodiment, the energy system has a recording device which communicates with the control device, the recording device being configured to record a connection of the charging interface with an external energy source and optionally to record the grid capacity of the external energy source.

It is appropriate if the energy system has a recording device which communicates with the control device to record a connection of the charging interface with an external energy source, e.g., a charging station, wherein the control device is configured for sub-dividing the energy storage device into blocks, as a function of the recording result provided by the recording device. If the recording device records an external energy source connected to the charging interface, e.g., a charging point, the control device will execute a sub-division of the energy storage device into blocks.

One embodiment specifies that the recording device is configured, when the connection between an external energy source and the charging interface is recorded, to record the grid capacity of the external energy source, and the control device is configured to execute a sub-division of the energy storage device into blocks, as a function of the recording result provided by the recording device.

Accordingly, a sub-division, individually adapted to the respective energy source, of the energy storage device into blocks and/or a grouping of the electrical cells or cell modules is possible such that an optimal charging strategy of the energy storage device can be created and executed. The grid capacity can be recorded by means of corresponding sensors which communicate with the recording device.

If the recorded charging voltage of the external energy source, for example, is twice as much as the nominal voltage of the energy storage device, the control device sub-divides the energy storage device into two equally sized blocks. The same thing applies when the charging voltage is three times or four times the nominal voltage of the energy storage device, that is the energy storage device is dynamically sub-divided with consideration of the charging voltage which can be provided by the connected external energy source.

In a further development of the invention, the recording device communicating with the control device may be formed to record the state of charge of the energy storage device and/or the respective blocks and/or the electrical cells and/or cell modules and to output at least one piece of information related to the respective state of charge. Accordingly, a user is always informed of the current state of charge of the energy storage device and/or the respective blocks and/or the electrical cells and/or cell modules. The information signal can additionally contain information on the expected charging duration or remaining charging duration or approximate resulting costs from the charging process, that is information which may be of interest to a user before or during charging of the energy storage device.

Moreover, it is advantageous when the recording device is also formed to record the functionality of the energy storage device and/or the charging interface connected to the energy storage device and optionally a charging cable and to output an information signal to a user as a function of the recording result. Thus, it is possible to provide information to a user as to whether a charging process is basically possible, that is information on the operating capacity and/or state of readiness of all components directly or indirectly affected by the charging process, particularly electrical contacts, electrical connections between the external energy source and the energy storage device, and/or electrical connections between the energy storage device and the motor vehicle components being provided with electrical energy by said device.

Preferably, the test of functionality and the output of the information signal are executed automatically after the motor vehicle is parked and ready to charge. The test of functionality can additionally be repeated one or more times during the charging process.

It is appropriate if the information signal can be output by means of at least one output means on the motor vehicle. Output means installed on the motor vehicle may be, e.g., output means in the area of the charging connection elements, e.g., optical display means such as light diodes, or even output means installed in the interior of the motor vehicle such as displays or speakers. In an alternative embodiment, the information signal is transmitted to a user radio signal-like by means of a wireless connection between a transmitting device on the motor vehicle and a receiving device with the user; thus, the information signal is not output on the motor vehicle itself but rather transmitted by it to a receiving device with the user by means of a transmitting device. The user receiving device may be, for example, part of a user receiving device, such as a mobile transmitting and receiving device, such as a mobile telephone or a smartphone. The information signal to be transferred may be acoustic and/or visual. A haptic output, via vibrations for example, is also conceivable. Of course, it is also possible to both output the information signal on the vehicle, and to transmit to a user receiving device.

The energy storage device is preferably assigned to the drive unit of the motor vehicle, particularly an electric motor formed as the drive unit. In this respect, the motor vehicle is preferably to be understood as an at least partially electrically driven motor vehicle, that is as a hybrid vehicle or a purely electric vehicle, e.g., a battery-electric vehicle (BEV) or a fuel cell vehicle. In exceptional cases, the energy storage device may also be assigned to other motor vehicle components, for example an auxiliary vehicle heater installed in the motor vehicle.

The invention also includes a charging system with a motor vehicle and a charging device outside the vehicle, which is coupled to the electrical energy storage device for charging said device. The charging device may also be designed as a charging point at an electric vehicle charging station. In this case, the charging device can provide, for example, a direct current, which is fed to the motor vehicle, for example, by means of a charging cable, which is connected to the charging interface by means of a plug connection.

However, a provision may also be that the charging device be a typical household plug, which is connected to an alternating current grid and provides alternating current. This alternating current can be provided to the motor vehicle by means of the charging interface and be rectified inside the vehicle by means of a rectifier for charging the electrical energy storage device. The charging process in this case is alternating current charging. Alternatively, the charging device may also be designed as a primary coil and the charging interface may be designed as a secondary coil, wherein the energy from the charging device is transmitted inductively to the charging interface. The charging process in this case is inductive charging.

Additional advantages and embodiments of the invention result from the description and the examples. The invention is described in greater detail in the following using exemplary embodiments.

It is understood that the previously mentioned and subsequent features to be explained can not only be used in the combinations indicated but also in other combinations or alone without going beyond the scope of the present invention.

In an exemplary embodiment, the electrical energy storage device of a motor vehicle has a nominal voltage of 400 V. The energy storage device has two equivalent energy storage sub-devices (blocks), which can be electrically connected in a parallel connection or in a series connection by means of the switching devices. A control device controls the switching devices in order to connect the energy storage sub-devices in parallel or in series. During operation of the motor vehicle, the energy storage sub-devices are connected in parallel by means of the switching devices.

The following computing example represents the shortening of the charging duration of a charging process, which is charged—via an external energy source (charging point)—with a nominal voltage which is adjustable within a range of from 0 V to 1000 V and a maximum charging current strength of 350 A.

With a charging voltage of 400 V and a charging current of 350 A, the charging process of the energy storage unit having blocks in a parallel connection would last about 4 h. The charging capacity of the external energy source here is 400 V×350 A=140 kW.

According to the invention, the blocks are connected in a series connection by means of the switching devices during the charging operation. With two energy storage sub-devices formed as batteries with 400 V nominal voltage each, an energy storage device with 800 V nominal voltage results in the series connection.

Due to the series connection of the blocks, the energy storage device can then be charged with a charging voltage of 800 V. The charging time of the energy storage device can thereby be shorted to only about 2 h. The time savings is due to the fact that a higher charging capacity of the charging point can be obtained, namely 800 V×350 A=280 kW.

Due to the series connection of the two energy storage sub-devices during the charging process, i.e., due to the temporary doubling of the nominal voltage of the energy storage device, double the charging capacity can be obtained from the charging device with the specified charging current as compared to the parallel connection of the energy storage sub-devices.

After the charging process is complete, the energy storage sub-devices are again connected in parallel by means of the switching device.

In another exemplary embodiment, the electrical energy storage device of a motor vehicle has a nominal voltage of 300 V and three equivalent blocks, which can be electrically connected in a parallel connection or in a series connection by means of the switching devices.

The energy storage device can be set to a charging voltage within a range of 0 V to 1000 V at a charging point and charged with a maximum charging current strength of 350 A, limited only by the current carrying capacity of the charging cable of the charging point or of the charging connector.

With a parallel connection of the blocks, a maximum charging capacity of 300 V×350 A=105 kW can be used. In contrast, if the blocks are connected in series during the charging process, a charging capacity of up to 900 V×350 A=315 kW can be used, whereby the charging time is reduced by about one-third.

The invention claimed is:

1. A method for charging at least one electrical energy storage device of a motor vehicle, comprising:
electrically subdividing a plurality of electrical cells of the energy storage device into at least two equivalent energy storage sub-devices with the same number of electrical cells for the duration of the charging process and they are connected in series, wherein the at least one energy storage device is sub-divided into the energy storage sub-devices as a function of a charging voltage available for the charging process, wherein the total of the nominal voltages of the energy storage sub-devices is less than or equal to the charging voltage.

2. The method according to claim 1, wherein the at least one electrical energy storage device is sub-divided into n equivalent energy storage sub-devices, wherein n is an integer greater than 2.

3. The method according to claim 1, wherein the at least one electrical energy storage device comprises at least one traction battery of an electric vehicle or of a hybrid vehicle.

4. The method according to claim 1, wherein the at least one electrical energy storage device comprises a number of cells or cell modules, which can be or are sub-divided into at least two energy storage sub-devices, each comprising at least one electrical cell or a cell module, and wherein the energy storage sub-devices may optionally be connected in parallel or in series.

5. The method according to claim 2, wherein the at least one electrical energy storage device comprises at least one traction battery of an electric vehicle or of a hybrid vehicle.

6. The method according to claim 2, wherein the at least one electrical energy storage device comprises a number of cells or cell modules, which can be or are sub-divided into at least two energy storage sub-devices, each comprising at least one electrical cell or a cell module, and wherein the energy storage sub-devices may optionally be connected in parallel or in series.

7. The method according to claim 3, wherein the at least one electrical energy storage device comprises a number of cells or cell modules, which can be or are sub-divided into at least two energy storage sub-devices, each comprising at least one electrical cell or a cell module, and wherein the energy storage sub-devices may optionally be connected in parallel or in series.

\* \* \* \* \*